United States Patent [19]

Ikeda et al.

[11] Patent Number: 5,458,829
[45] Date of Patent: Oct. 17, 1995

[54] METHOD FOR CONTINUOUSLY RECYCLING WASTE PARTS HAVING A COATING THEREON

[75] Inventors: Sadao Ikeda, Toyota; Yoshio Taguchi, Nagoya; Makoto Kito; Atsushi Tanaka, both of Aichi, all of Japan

[73] Assignee: Toyota Jidosha Kabushiki Kaisha, Japan

[21] Appl. No.: 102,425

[22] Filed: Aug. 5, 1993

[30] Foreign Application Priority Data

| Aug. 6, 1992 | [JP] | Japan | 4-210268 |
| Sep. 25, 1992 | [JP] | Japan | 4-256500 |
| Sep. 28, 1992 | [JP] | Japan | 4-258483 |
| Oct. 27, 1992 | [JP] | Japan | 4-288855 |
| Feb. 4, 1993 | [JP] | Japan | 5-017405 |

[51] Int. Cl.⁶ ............... B29B 9/00; B29B 17/00
[52] U.S. Cl. ............... 264/37; 264/83; 264/140; 264/DIG. 69
[58] Field of Search ............... 264/37, DIG. 69, 264/83, 82, 140, 141, 142, 349

[56] References Cited

U.S. PATENT DOCUMENTS

| 4,051,212 | 9/1977 | Grigat et al. | 264/102 |
| 4,067,826 | 1/1978 | Emery | 264/37 |
| 4,098,649 | 7/1978 | Redker | 201/2.5 |
| 4,136,967 | 1/1979 | Grigat et al. | 366/82 |
| 4,328,368 | 5/1982 | Salloum et al. | 564/393 |
| 4,493,806 | 1/1985 | Hatzikelis et al. | 264/140 |
| 4,496,707 | 1/1985 | Liggett | 528/61 |
| 4,643,861 | 2/1987 | Hager | 264/37 |
| 4,968,463 | 11/1990 | Levasseur | 264/40.1 |
| 5,064,582 | 11/1991 | Sutton et al. | 264/37 |
| 5,215,625 | 6/1993 | Burton | 162/189 |
| 5,286,424 | 2/1994 | Su et al. | 264/37 |

FOREIGN PATENT DOCUMENTS

| 0547249A1 | 6/1993 | European Pat. Off. . | |
| 2283766 | 4/1976 | France . | |
| 53-25677 | 3/1978 | Japan | 264/37 |
| 55-140528 | 11/1980 | Japan . | |
| 55-166221 | 12/1980 | Japan | 264/37 |
| 57-140122 | 8/1982 | Japan | 264/37 |
| 58-89521 | 5/1983 | Japan . | |
| 59-83618 | 5/1984 | Japan | 264/37 |
| 1-163006 | 6/1989 | Japan . | |

OTHER PUBLICATIONS

"The recyling dream is turning" Modern Plastics Sept., 1972 pp. 64–65.
Database WPI Week 9305, Derwent Publications Ltd., London, GB; AN 93–045449 & JP-T-5 502 145 (Toyota Chuo Kenkyusho KK), Jul. 1, 1993 (abstract).

Primary Examiner—Jay H. Woo
Assistant Examiner—Duane S. Smith
Attorney, Agent, or Firm—Finnegan, Henderson, Farabow, Garrett & Dunner

[57] ABSTRACT

Waste parts made of synthetic resin and having a hydrolyzable coating thereon are crushed into chips. The chips are supplied quantitatively to a hydrolyzer apparatus where they are continuously transported through the hydrolyzer with a screw while in contact with steam so as to hydrolyze the coating. The chips with the hydrolyzed coating are dried in a drying furnace and the dried chips are transported to a kneader wherein the hydrolyzed coating is kneaded into chips. The kneaded chips are cooled and then pelletized into pellets in a pelletizing apparatus.

1 Claim, 10 Drawing Sheets

1

METHOD FOR CONTINUOUSLY RECYCLING WASTE PARTS HAVING A COATING THEREON

BACKGROUND OF THE INVENTION

1. Field of the Invention

The present invention relates to a method and plant for recycling waste parts, with a coating made of synthetic resin, especially with a method and plant enabling continuous recycling.

2. Description of the Prior Art

Recently, it has become necessary to reuse waste parts made of synthetic resin, for environmental reasons, and it is general to separate waste parts and reuse them as material for new products. It is, furthermore, general to coat products with thermosetting coating to add to the beauty of the products.

In the case of liquefying waste parts with a coating, a thermosetting coating is not decomposed. Therefore, material strength is degraded when synthetic resins containing undecomposed coatings are reused.

For instance, in a cold district, the material strength of bumpers made of synthetic resins containing undecomposed coatings is lower than that of bumpers made of synthetic resin without the coatings.

The degradation of material strength can be avoided if coating is removed, but perfect removal of the coating is too difficult.

Although coatings can be mechanically removed by shot blasting etc., it not only takes a long time but is impossible to perfectly remove the coating when parts have complicated shapes. Mechanical removal, therefore, is unsuitable for mass recycling.

Although removal of the coating with organic acid has been proposed, it causes environmental pollution.

To solve the above-mentioned problem, the present applicant has already proposed a method for recycling synthetic resin parts, that is, the coating thereof is hydrolyzed and kneaded into synthetic resin chips (See Japanese Patent Application No. 3-192431).

To shorten the process time, hydrolysis must be performed under a relatively high temperature atmosphere, but this is unavoidable if the synthetic resin is to liquefy.

When hydrolyzed synthetic resin is taken out from the vessel for hydrolyzing after cooling-down, it is impossible to reuse the synthetic resin as raw material without crushing, because it is again solidified.

On the other hand, when liquefied synthetic resin is reused as a raw material, it is necessary to keep a flow path of the liquefied synthetic resin at a relatively high temperature, but this requires more energy consumption.

SUMMARY OF THE INVENTION

Therefore, an object of the present invention is to provide a method and plant able to continuously recycle waste parts, with a coating, into raw, material for new products without degrading the material strength.

According this invention, waste parts made of synthetic resin with a coating are crushed and continuously supplied to a vessel. In this vessel, the coating is continuously hydrolyzed and powdered. Then the powdered coating is kneaded into the synthetic resin, and the kneaded synthetic resin is pelletized as material.

Further, a vessel for hydrolyzing which has a suitable structure for continuous hydrolyzing is proposed.

BRIEF DESCRIPTION OF THE DRAWINGS

Present invention will be more clearly understood from the description set forth below with reference to the accompanying drawings.

DESCRIPTION OF THE PREFERRED EMBODIMENTS

Figure 1:
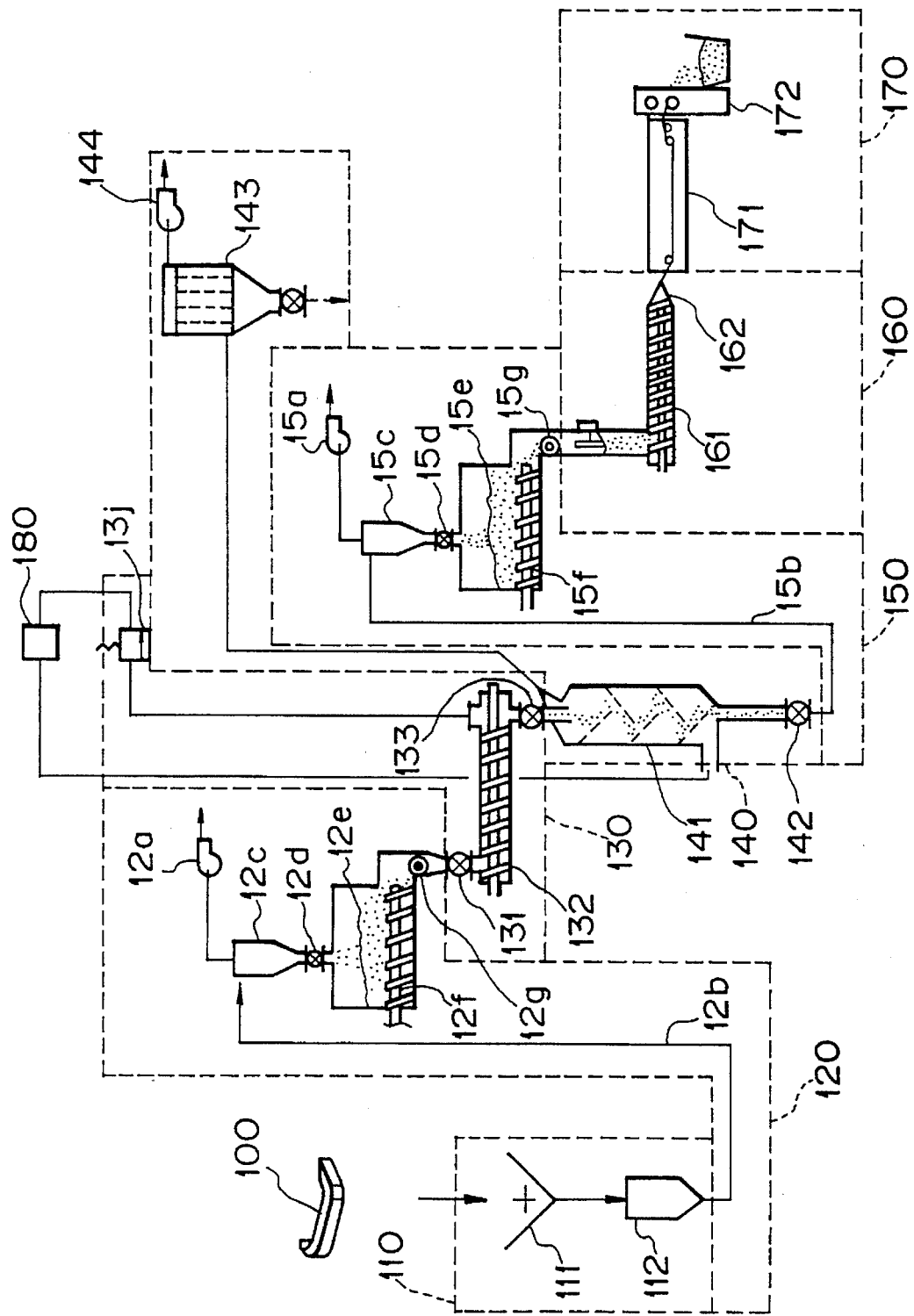
FIG. 1 is a flow-sheet of continuous regenerating plant for waste parts with coating made of synthetic resin.

FIG. 1 is a flow-sheet of continuous regenerating plant for waste parts with coating made of synthetic resin.

A waste part made of synthetic resin is, for example, a bumper 100 made of polypropylene (hereinafter referred to as PP) with a polyester melamine or an acrylic melamine coating on its surface.

Note, the synthetic resin is not limited to PP, and it may be allowable that synthetic resin is one kind of thermoplastic resin such as denaturation polypropylene, polyethylene, ABS resin, AS resin, polyamide resin, polyester resin, polycarbonate resin, polyacetal resin, polyphenylene oxide and denaturation polyphenylene oxide.

And it may also be allowable that coating is one kind of coating which can be hydrolyzed and decomposed to low molecular weight compound, such as a urethane type or an amino resin type.

A crusher 100 consists of a coarse crusher 111 and a fine crusher 112. At first, a bumper 100 with a paint film is crushed to specific sized strips, for example 30 cm length×5 mm width×5 mm thick, by the coarse crusher 111, and is further crushed to chips, for example 5 mm×5 mm×5 mm cubes, by the fine crusher 112.

Chips are supplied to the first quantitative let-off apparatus 120. This consists of a suction fan 12a, a transport pipe 12b, a cyclone 12c, a rotary feeder 12d, a stock bin 12e, a transport screw 12f and a measuring screw 12g.

Namely, chips are transported to the cyclone 12c though the transport pipe 12b by suction force of the suction fan 12a. Note, a belt conveyer can be used instead of the transport pipe 12b.

Chips stored in the cyclone 12c are transported to the stock bin 12e by the rotary feeder 12d arranged at the bottom of the cyclone 12c.

Chips transported to the stock bin 12e are gathered to one side by the transport screw 12f arranged at the bottom of the stock bin 12e, and delivered to an apparatus for hydrolyzing by the measuring screw 12g.

This apparatus for hydrolyzing 130 consists of an upstream rotary feeder 131, a vessel 132 and downstream rotary feeder 133.

The upstream rotary feeder 131 and the downstream rotary feeder 133 have same construction, and transport chips quantitatively. Namely, a quantity of chips which are supplied from the upstream rotary feeder 131 to the vessel 132, or that which are delivered from the vessel 132 to the downstream rotary feeder 133 can be adjusted by the rotational speed of a rotor.

The vessel 132 is used for continuous hydrolyzing of the coating on the chips in steam while the chips are transported from an inlet to an outlet by a screw.

The steam conditions for hydrolyzing are not specified, but it is desirable to keep the temperature as high as possible so long as the chips are not liquefied in order to reduce the time for hydrolyzing and to promote easy handling after hydrolyzing, because it is impossible to transport liquefied chips with a screw.

Note, it is suitable that chips are hydrolyzed for 0.5–2 hours in steam at 160° C., if the synthetic resin is PP. An accelerator for hydrolyzing, such as an acid or, an alkali may be added.

After hydrolyzing, each chip has a hydrolyzed and powdered coating around it.

Chips transported to an outlet are delivered by concavities 13d of the downstream rotary feeder 133, and supplied to a dryer apparatus 140.

The dryer apparatus 140 consists of a dry furnace 141, a rotary feeder 142, a bag filter 143 and suction fan 144.

In the dry furnace 141, the moisture contained in the hydrolyzed chips is reduced to below about 0.1% by a hot blast generated from a hot blast furnace (not shown). Wet air is sucked by the suction fan 144, and released to the outside air.

Note, the hydrolyzed and powdered coating is caught in the bag filter before being released to the air.

Superheated steam may be used to dry the chips instead of the hot blast. In this case, an energy-saving can be accomplished by supplying steam which is released from relief valves arranged on the vessel, dehumidified and superheated, by a dehumidifier and superheater 180, and not using the hot blast furnace.

Chips from the bottom of the dry furnace 141 are delivered by the rotary feeder 142, and supplied to the second quantitative let-off apparatus 150.

The second quantitative let-off apparatus 150 consists of a suction fan 15a, a transport pipe 15b, a cyclone 15c, a rotary feeder 15d, a stock bin 15e, a transport screw 15f and a measuring screw 15g similar to the first quantitative let-off apparatus 120. This apparatus supplies chips to a kneader 160.

The kneader 160 consists of a biaxial kneader 161 and an extruding die 162.

The biaxial kneader 161 kneads the hydrolyzed coating, the size thereof being less than twenty or thirty μm, into chips.

Kneaded chips are extruded from the extruding die 162 which has holes each thereof, for example 3 mm in diameter, and supplied to a pelletizing apparatus 170.

The pelletizing apparatus 170 consists of a water tank for cooling 171 and a cutter 172.

The extruded synthetic resin is cooled in the water tank 171 to solidify and the extruded synthetic resin is cut by the cutter 172 into pellets.

Figure 2:
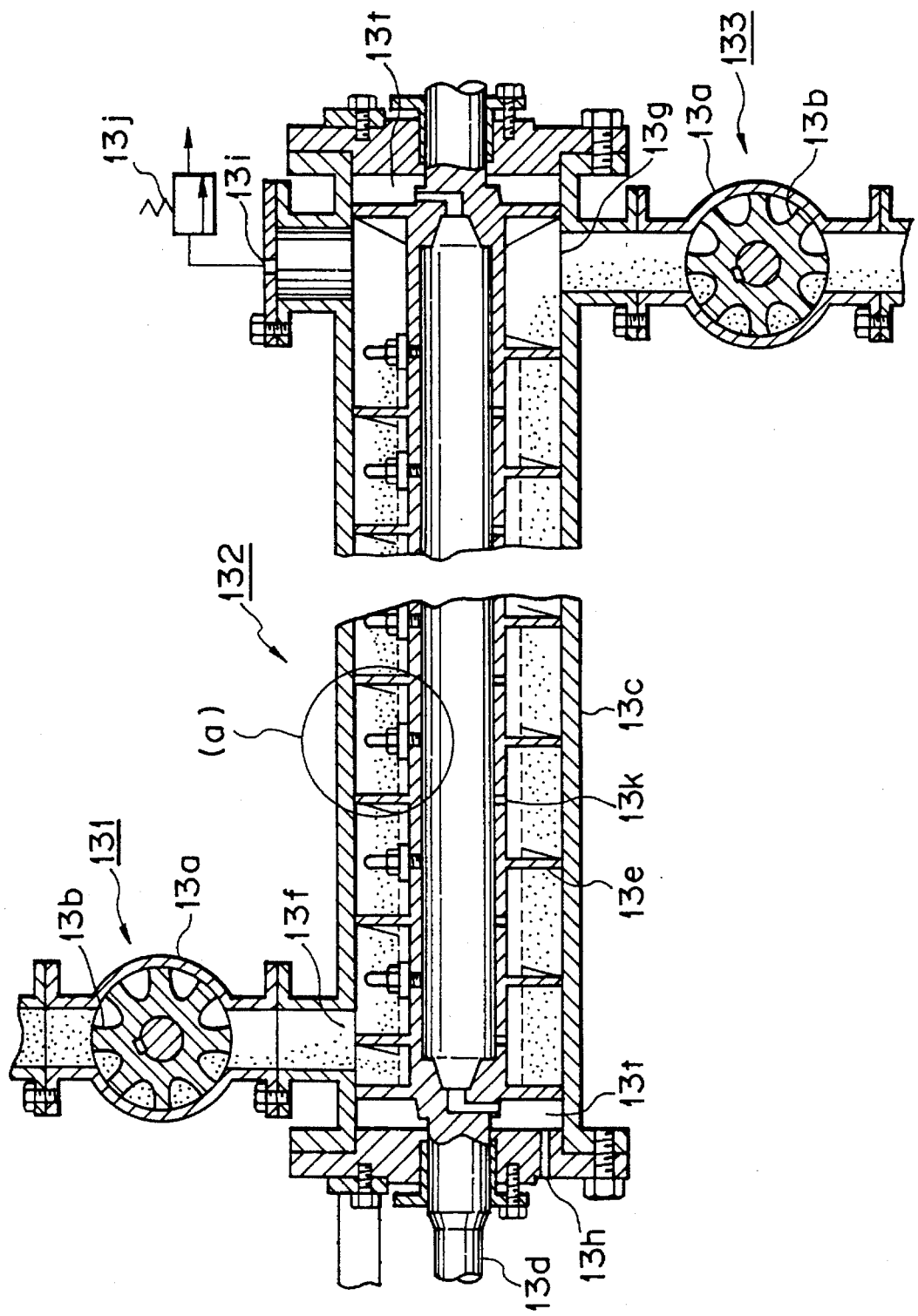
FIG. 2 is a sectional drawing of a vessel for hydrolyzing.

FIG. 2 shows the cross sectional drawing of the first embodiment of the hydrolysis apparatus 130.

Chips supplied from an inlet arranged at the top of the casing 13a of the upstream rotary feeder 131, are quantitatively transported to an outlet arranged at its bottom of it by concavity 13b made on the rotor driven by a motor.

The rotor 13b is arranged so as to touch the casing 13a, and it does not allow high-temperature and high-pressure steam to leak from the hydrolyzing vessel 132 to the first quantitative let-off apparatus 120 arranged at the upstream side of the hydrolyzing vessel.

The vessel 132 has a hollow shaft 13d along the axis the cylindrical casing 13c.

Around the hollow shaft 13d, a screw 13e is arranged so as to transport chips from the inlet 13f and the outlet 13g when the hollow shaft 13d is driven by a motor (not shown).

Further, around the hollow shaft 13d, plural exhaust nozzles are arranged. As steam supplied from a steam inlet 13h through the hollow shaft 13d is delivered therefrom, coating on the chips is continuously hydrolyzed and decomposed while chips are transported from the chip inlet 13f to the chip outlet 13g.

Temperature and pressure of steam in the vessel 132 is controlled by the relief valve 13j connected to the steam outlet 13i.

Further, steam cavities connected to the hollow shaft 13d are arranged at the both side of the vessel 132. Therefore, pressure in two cavities are equal and do not generate a thrust force, to make the thrust bearings simple.

Figure 3:
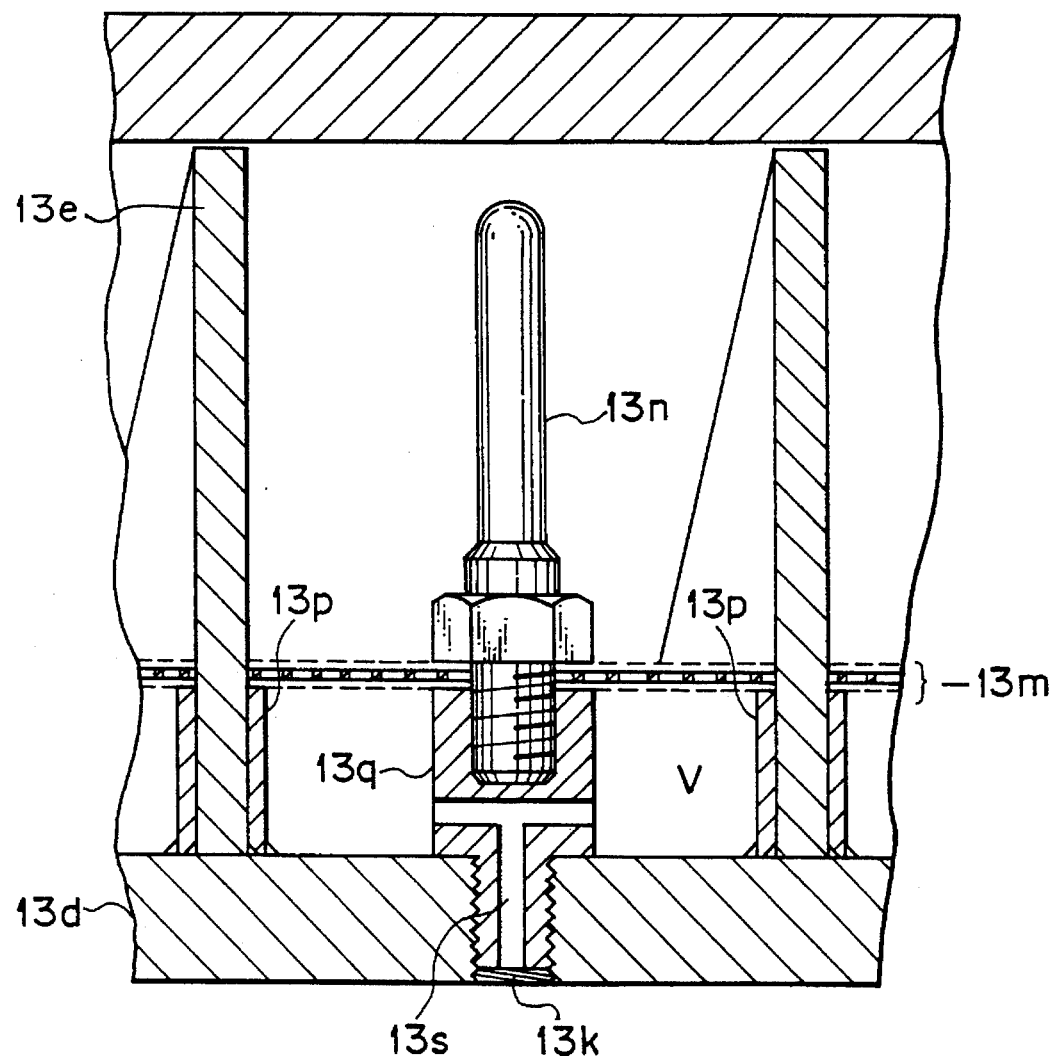
FIG. 3 is a partial enlarged drawing of the vessel for the first embodiment.

FIG. 3 shows an enlarged view of a part (a) in FIG. 2 to explain the second to the sixth embodiments.

In the second embodiment, an isolation wall 13m is arranged around the hollow shaft 13d, and a steam chest is constituted between the isolation wall 13m and the hollow shaft 13d uniformly to distribute steam exhausted from the nozzles 13k. To keep the distance from the hollow shaft 13d to the isolation wall 13m, plural cylindrical supporters 13p are arranged at the side of the screw 13e.

Further, plural screw supporters 13q for the isolation wall 13m are arranged around the exhaust nozzles 13k. Note, steam flow paths are drilled in these screw supporters 13q.

Figure 4:
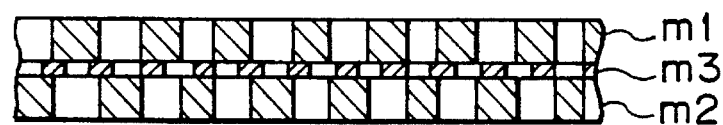
FIG. 4 is a structural drawing of an isolation wall.

As shown in FIG. 4 in the third embodiment, the isolation wall 13m practically used has a laminated structure which consists of two sheets of punched metal having rather larger nozzle areas m1 and m2, and a sheet of 200–600 mesh wire screen m3 put between the two sheets of punched metal.

That is, the two sheets of punched metal m1 and m2 support the weight of the chips, and the wire screen m3 protects exhaust nozzles from being plugged by powdered coating which falls into the steam chest.

In the fourth embodiment, shaking bars 13n are screwed in the supporters 13q to improve mixing of chips and steam.

In the fifth embodiment, areas of the exhaust nozzles on the hollow shaft 13d are proportionally decreased to the downstream of the vessel 132. Hydrolysis, therefore, is accelerated, as more steam is supplied at the upstream side of the vessel 132 than at the downstream side.

In the sixth embodiment, areas of the exhaust 10 nozzles are equal, but areas of the steam paths drilled in the screw supporters 13q are proportionally decreased to the downstream. The amount of steam exhausted from the steam paths can be trimmed by replacing the screw supporters 13q.

Figure 5:
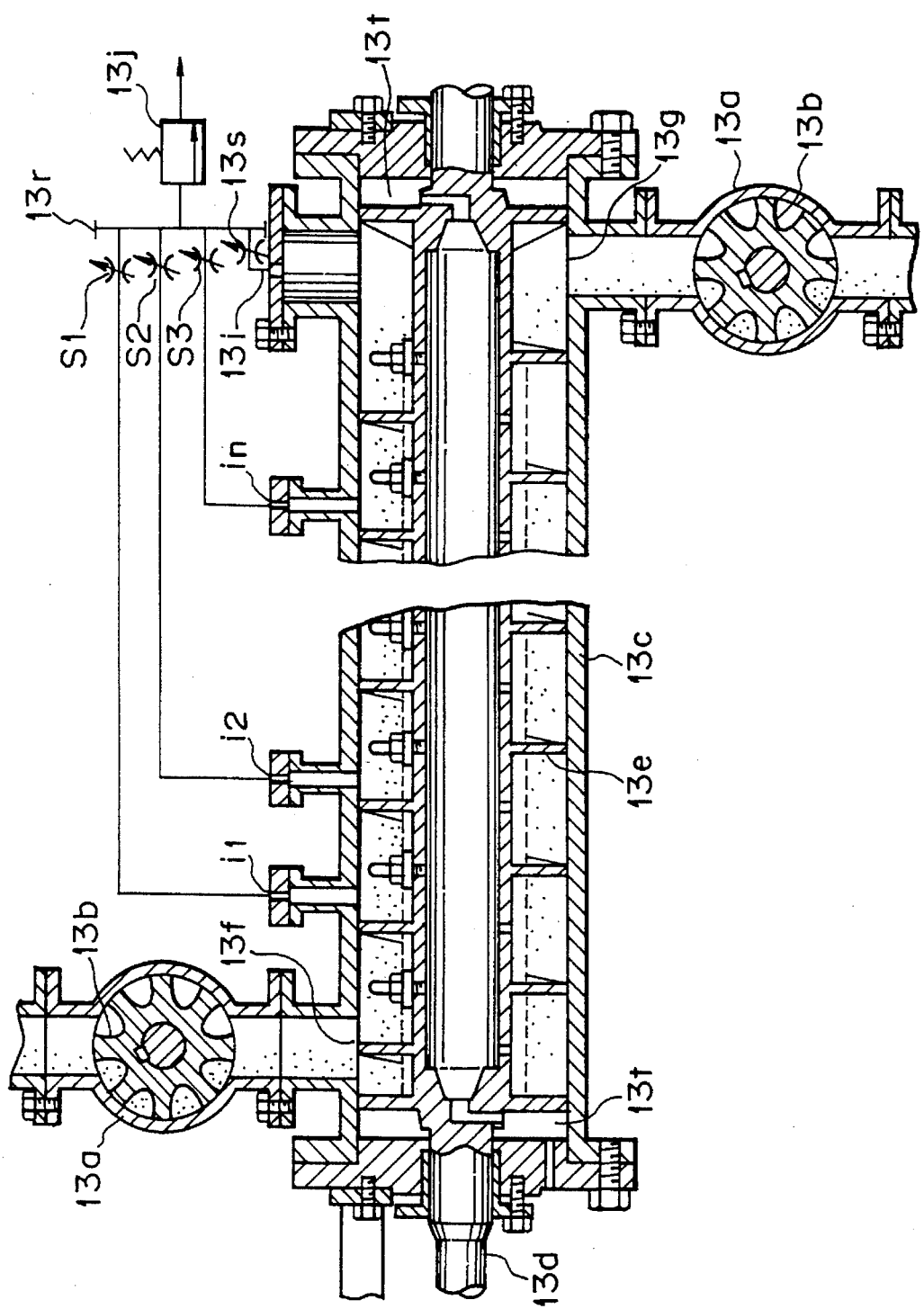
FIG. 5 is a sectional drawing of the vessel for the seventh embodiment.

FIG. 5 shows a sectional drawing of the seventh embodiment, and additional steam outlets, for example three outlets i1, i2 and i3, except a main steam outlet 13i at the end of the vessel 13c are arranged. Each additional steam output is connected to an outlet steam header 13r, and three flow control valves s1, s2 and s3 are installed between each additional steam outlet and the outlet steam header 13r.

According to the seventh embodiment, more steam may be supplied, because used low energy steam is quickly exhausted.

To shorten hydrolyzing time, the temperature of steam supplied to the vessel may be increased but, in this case, the treatment becomes difficult because hydrolyzed chips will tend to solidify as one block.

To solve above-mentioned problem, it can be arranged that a part of the casing is constructed as a sink for storing hot water so that hydrolysis is accelerated by increasing the rate of reaction between the paint film and water molecules and then solidification by dead-weight can be avoided because the chips float on hot water.

Figure 6:
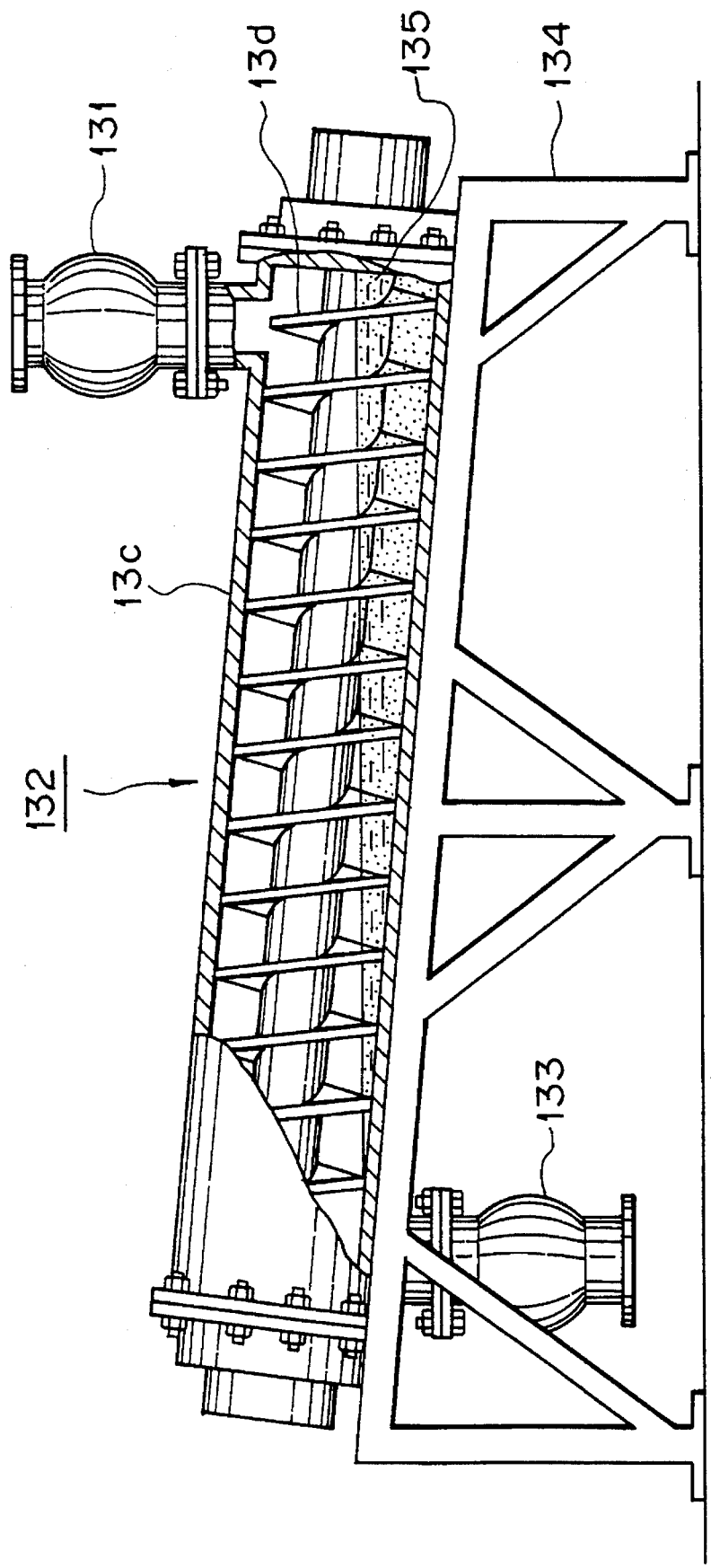
FIG. 6 is a sectional drawing of the vessel for the eighth embodiment.

FIG. 6 shows a partial sectional drawing of the eighth embodiment, the vessel 132 is installed on a frame 134 so as the level of the chip inlet side 131 is lower than that of the chip outlet side 133. Hot water 135 can be stored at the chip inlet side 131 of the vessel 132.

Figure 7:
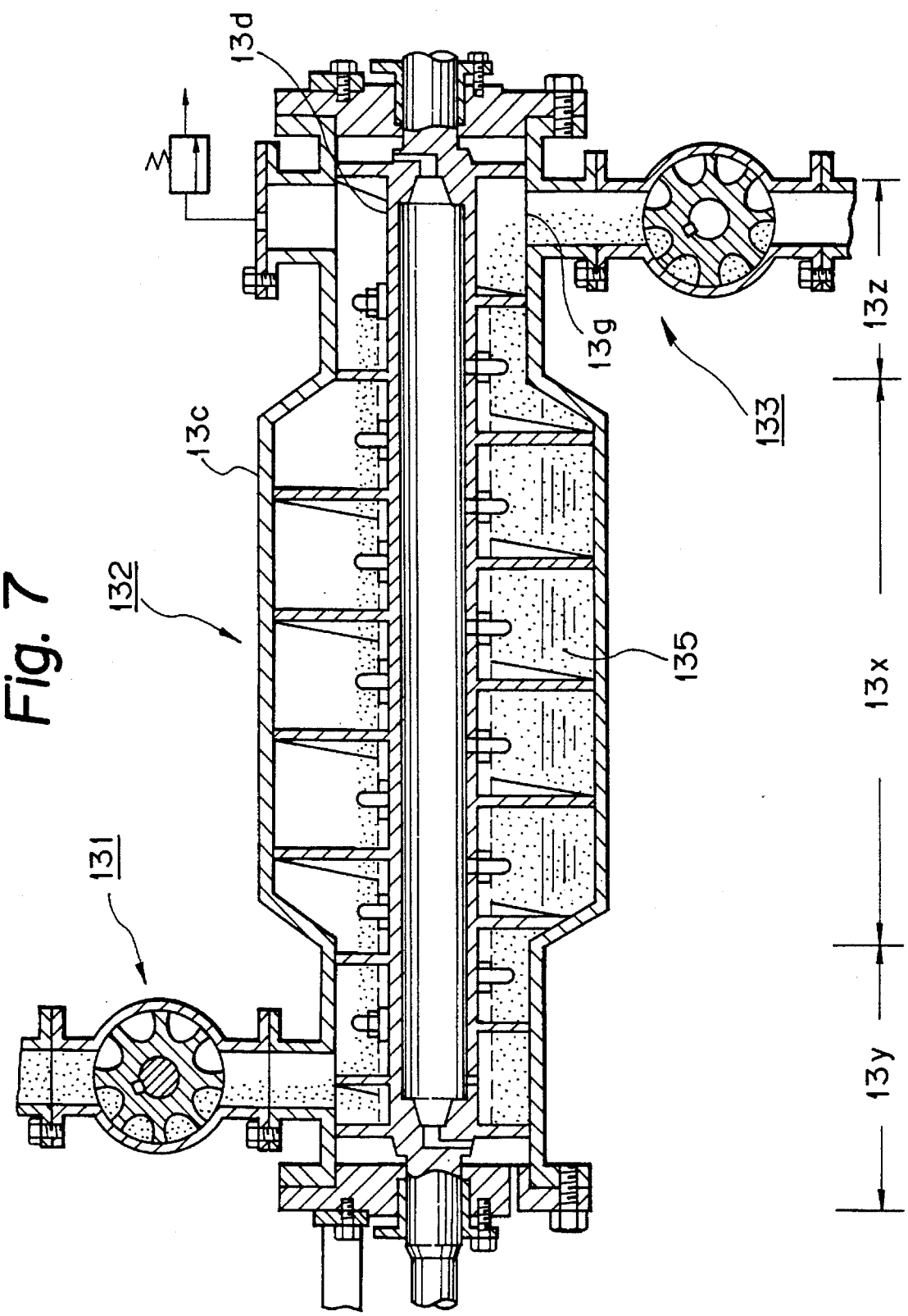
FIG. 7 is a sectional drawing of the vessel for the ninth embodiment.

FIG. 7 shows the sectional drawing of the ninth embodiment where the diameter of the center part of the vessel 13x is formed larger than that of both ends of the vessel 13y and 13z. Hot water, therefore, can be stored in the center part of the vessel 13x.

Hydrolysis can be accelerated by installing at least one microwave generator on the casing of the vessel.

Figure 8:
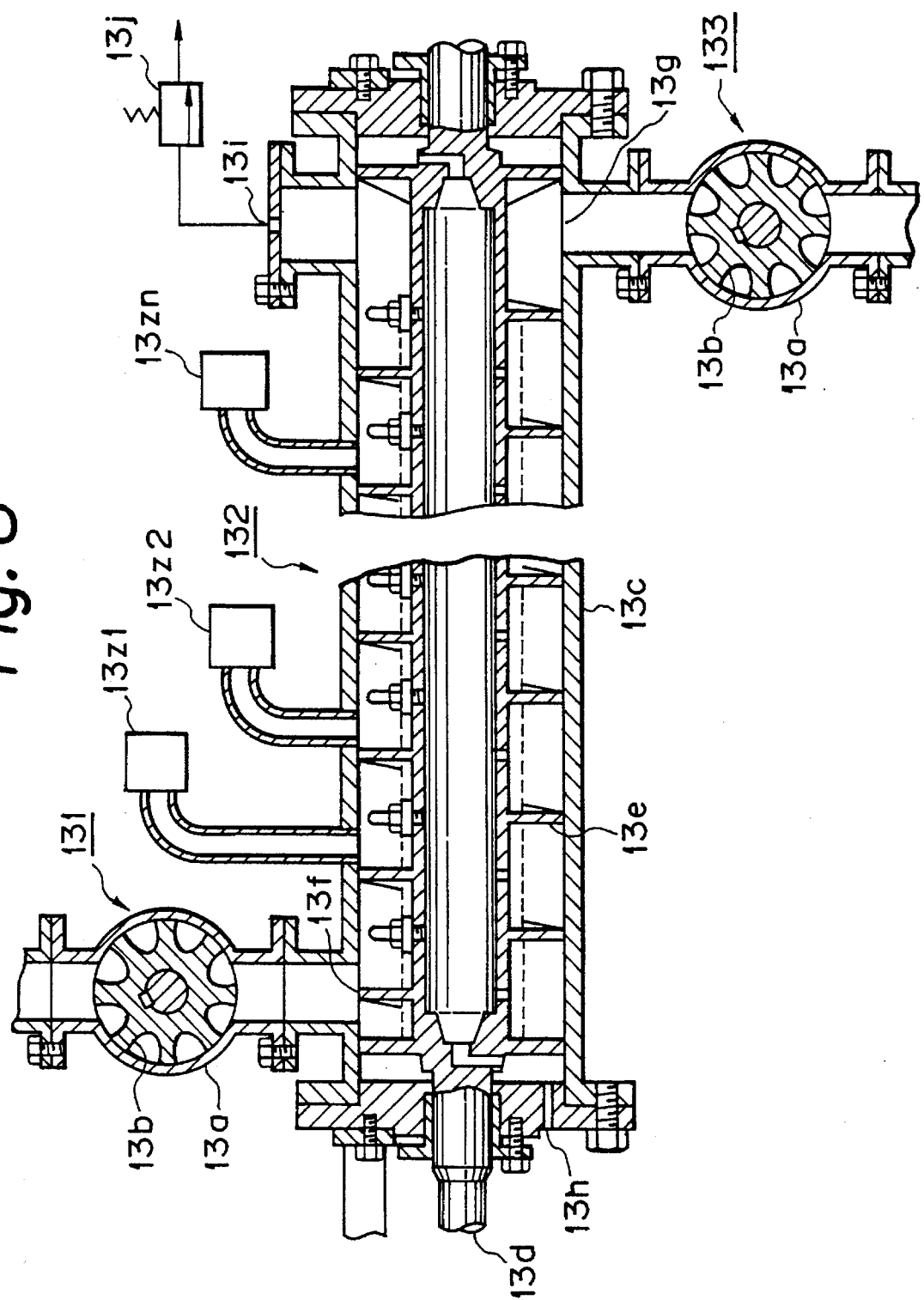
FIG. 8 is a sectional drawing of the vessel for the tenth embodiment.

FIG. 8 shows the sectional drawing of the tenth embodiment with microwave generators $13z1$, $13z2$ ... $13zn$. The paint film on the surface of the synthetic resin chips increases in temperature by absorbing microwaves generated by the microwave generators $13z1$, $13z2$ ... $13zn$, and the hydrolysis of the coating can be accelerated. On the other hand, the synthetic resin chips can not absorb microwaves, so the temperature of the chips does not rise. The temperature in the vessel, therefore, can be maintained rather low while speed of hydrolysis is accelerated.

In order to hydrolyze a large amount of chips, it is necessary that volume of the vessel, that is its length and/or diameter, is increased. In this case, however, the following problems must be solved. Increasing of the diameter of the vessel requires increasing the diameter of the screw, but does not cause increasing of an effective volume for hydrolysis. Increasing of the length causes thermal distortion of the vessel and the hollow shaft.

Figure 9:
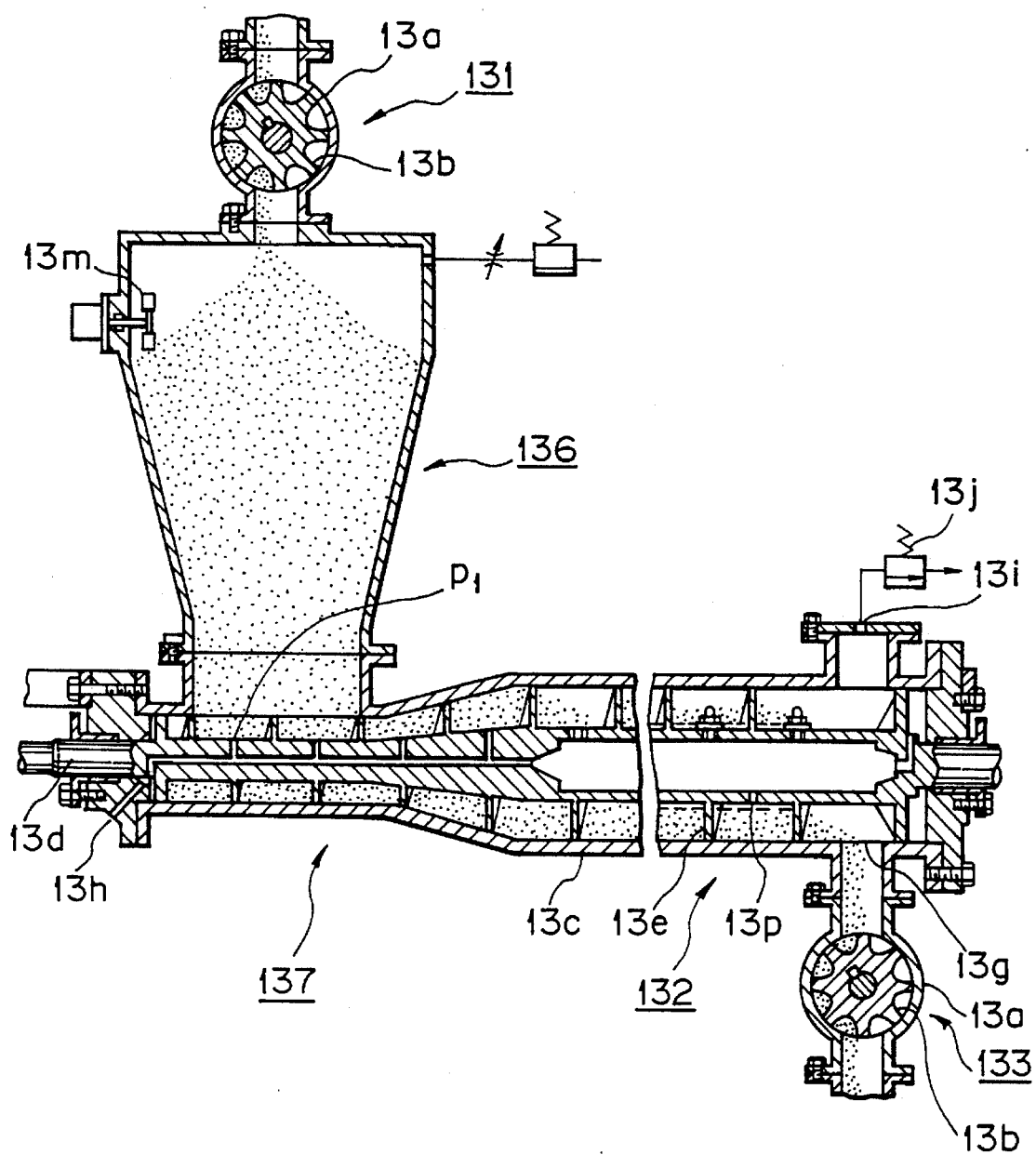
FIG. 9 is a sectional drawing of the vessel for the eleventh embodiment.

FIG. 9 shows the sectional drawing of the eleventh embodiment to solve above-mentioned problem, and this consists of an upstream rotary feeder 131, a hopper 136, a quantitative feeder 137, a main vessel for hydrolysis 132 and a downstream rotary feeder 133.

In the eleventh embodiment, the hopper 136 is used as the vessel for preliminary hydrolyzing and the quantitative feeder 137 is arranged upstream of the main vessel 132 to keep the length and/or diameter of the main vessel 132 within reasonable limits.

The hollow shaft 13d is commonly used for the quantitative feeder 137 and the main vessel 132, and has plural exhaust nozzles. Steam supplied from a steam inlet 13h and exhausted form nozzles p1, is led to the hopper 136 arranged on the quantitative feeder 137, and coating on the chips stored in the hopper 132 is preliminarily hydrolyzed.

In the hopper 136, a level sensor 13m, for example a rotary level sensor, is installed. When the hopper 136 is filled with chips, and the moving of the rotary level sensor 13m is locked by the chips, the rotational speed of the upstream rotary feeder 131 is decreased so that amount stored in the hopper does not increased.

Chips in the hopper 132 fall to the quantitative feeder 137 and are transported to the main vessel 132 by a screw e1 driven by a motor (not shown). Note, the diameter of the hollow shaft 13d is proportionally increased to the downstream of the quantitative feeder 133.

Diameter of the casing of the main vessel 132 for hydrolyzing is larger than that of the quantitative feeder 137, so that a volume of the chest arranged between the casing 13c and the hollow shaft 13d is increased so that chips are blown by steam.

Pelletized synthetic resin made by above-mentioned process can be recycled, for example, as raw material to make bumpers.

To understand the characteristics of this pelletized synthetic resin as raw material, Izod impact test and a test for evaluating cold brittleness for test pieces was performed based on Japan Industrial Standards.

Note, condition for hydrolysis is following.

| Temperature | 160° C. |
|---|---|
| Pressure | 5.5 kg/cm$^2$ |
| Hydrolyzing time | 1 Hour |

Figure 10:
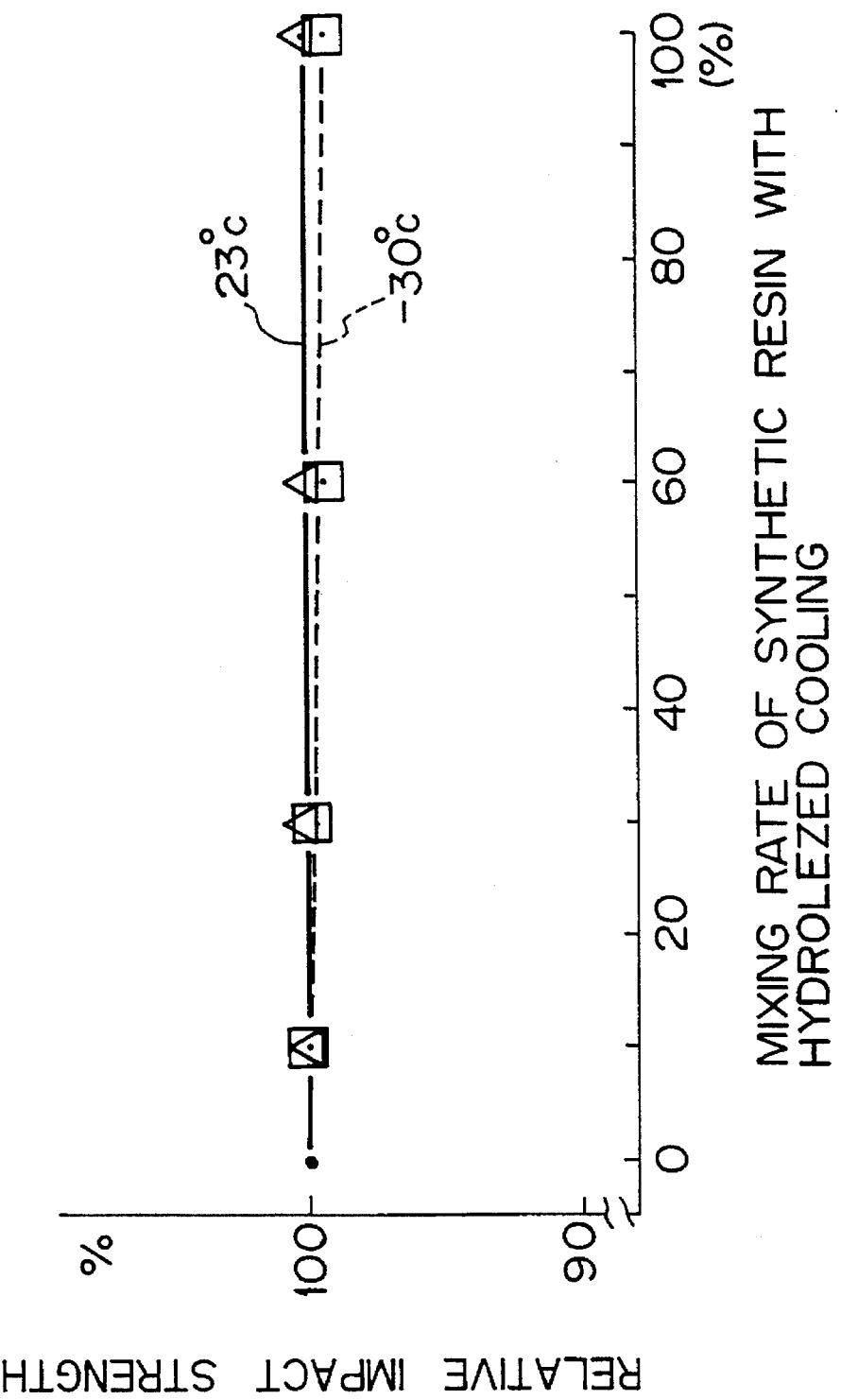
FIG. 10 is a graph showing the result of the Izod impact test.

FIG. 10 is a graph showing the result of Izod impact test. Abscissa denotes mixing rate of synthetic resin with hydrolyzed coating, and ordinate denotes rate of impact strength of synthetic resin with hydrolyzed coating against that of synthetic resin without hydrolyzed coating.

Note, solid line shows the result of Izod impact test at 23° C. ambient temperature, and dotted line shows at −30° C.

As shown in this graph, impact strength is almost constant regardless of mixing rate of synthetic resin with hydrolyzed coating, and when the bumper is made only from synthetic resin with hydrolyzed coating, its impact strength is not lowered.

Figure 11:
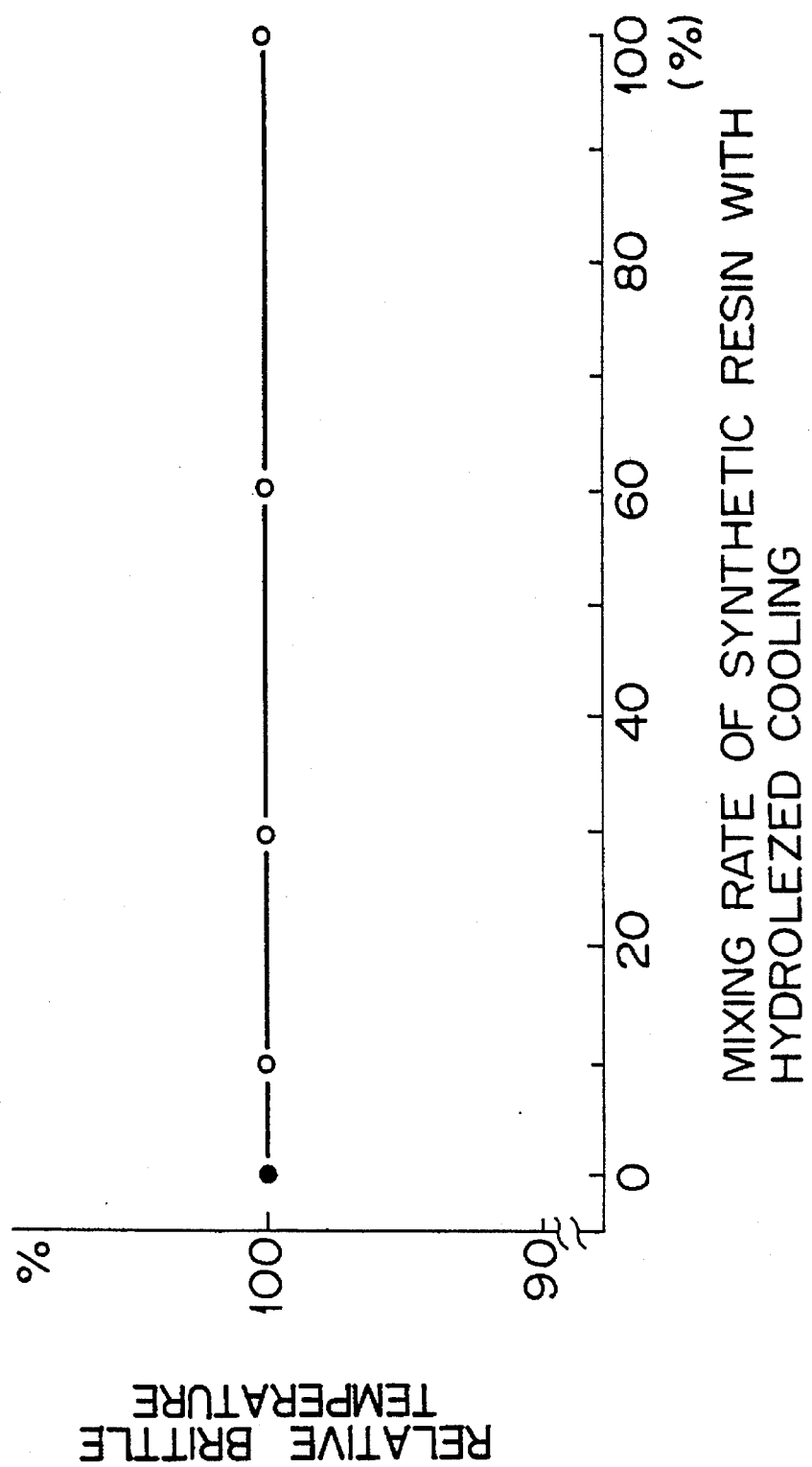
FIG. 11 is a graph showing the result of a low temperature brittleness test.

FIG. 11 is a graph showing the result of test for evaluating cold brittleness. Abscissa denotes mixing rate in the test piece of synthetic resin with hydrolyzed coating, and ordinate denotes rate of brittle temperature of synthetic resin with hydrolyzed coating against that of synthetic resin without hydrolyzed coating.

As shown in this graph, brittle temperature is almost constant regardless of mixing rate of synthetic resin with hydrolyzed coating, and when the bumper is made only from synthetic resin with hydrolyzed coating, its brittle temperature is not lowered.

Note, rupture elongation, tension strength, flexural strength, modulus of flexural rigidity, hardness and MI value of synthetic resin with hydrolyzed coating are also same as these of synthetic resin without hydrolyzed coating.

Moreover, to understand effect of radiation by microwaves, the following test was performed.

| | |
|---|---|
| Synthetic resin | PP |
| Temperature | 160° C. |
| Pressure | 5.5 kg/cm² |
| Hydrolyzing time | 0.5 Hour |

Brittle temperatures of test piece (A) made from chip not radiated by microwave and test piece made from chip (B) radiated by microwave are evaluated.

Test result is shown about rate of brittle temperature of test pieces against brittle temperature of synthetic resin without hydrolyzed coating.

| | |
|---|---|
| Brittle temperatures of test piece (A) | −25% |
| Brittle temperatures of test piece (B) | −2% |

As mentioned above, brittle temperature is remains the same as that of synthetic resin without hydrolyzed coating.

We claim:

1. A method for continuous recycling waste parts made of synthetic resin with a coating which can be hydrolyzed, comprising the steps of, crushing the waste parts with the coating into chips, quantitatively supplying the chips to a hydrolyzer apparatus, continuously transporting the chips through the hydrolyzer apparatus while contacting the chips therein with steam at an elevated temperature below the liquefaction temperature of the chips so as to hydrolyze the coating, drying the resulting chips with the hydrolyzed coating in a drying furnace, quantitatively removing the resulting dried chips from the drying furnace and transporting them to a kneader, kneading the hydrolyzed coating into chips in the kneader, cooling the kneaded chips and pelletizing the cooled chips into pellets in a pelletizing apparatus.

\* \* \* \* \*